US005604882A

United States Patent [19]
Hoover et al.

[11] Patent Number: 5,604,882
[45] Date of Patent: Feb. 18, 1997

[54] SYSTEM AND METHOD FOR EMPTY NOTIFICATION FROM PEER CACHE UNITS TO GLOBAL STORAGE CONTROL UNIT IN A MULTIPROCESSOR DATA PROCESSING SYSTEM

[75] Inventors: Russell D. Hoover; John C. Willis, both of Rochester; Donald F. Baldus, Mazeppa; Frederick J. Ziegler, Rochester, all of Minn.; Lishing Liu, Pleasantville, N.Y.

[73] Assignee: International Business Machines Corporation, Armonk, N.Y.

[21] Appl. No.: 113,554

[22] Filed: Aug. 27, 1993

[51] Int. Cl.$^6$ ..................................................... G06F 12/08
[52] U.S. Cl. ........................... 395/448; 395/471; 395/472; 395/474
[58] Field of Search ............................ 364/200 MS File, 364/900 MS File; 395/425, 448, 447, 468, 471, 472, 474–480, 200.08

[56] References Cited

U.S. PATENT DOCUMENTS

| | | | |
|---|---|---|---|
| 4,197,580 | 4/1980 | Chang et al. | 364/200 |
| 4,394,731 | 7/1983 | Flusche et al. | 364/200 |
| 4,500,954 | 2/1985 | Duke et al. | 364/200 |
| 4,747,043 | 5/1988 | Rodman | 395/425 |
| 4,885,680 | 12/1989 | Anthony et al. | 364/200 |
| 4,974,156 | 11/1990 | Harding et al. | 364/200 |
| 4,992,930 | 2/1991 | Gilfeather et al. | 364/200 |
| 5,025,365 | 6/1991 | Mathur et al. | 364/200 |
| 5,029,070 | 7/1991 | McCarthy et al. | 395/470 |
| 5,058,006 | 10/1991 | Durdan et al. | 395/325 |
| 5,151,989 | 9/1992 | Johnson et al. | 395/600 |
| 5,197,146 | 3/1993 | LaFetra | 395/471 |
| 5,222,224 | 6/1993 | Flynn et al. | 395/425 |
| 5,226,143 | 7/1993 | Baird et al. | 395/472 |
| 5,226,144 | 7/1993 | Moriwaki et al. | 395/448 |
| 5,230,070 | 7/1993 | Liu | 395/425 |
| 5,241,664 | 8/1993 | Ohba et al. | 395/448 |
| 5,274,787 | 12/1993 | Hirano et al. | 395/470 |
| 5,297,269 | 3/1994 | Donaldson et al. | 395/472 |
| 5,313,609 | 5/1994 | Baylor et al. | 395/448 |
| 5,317,716 | 5/1994 | Liu | 395/471 |
| 5,353,428 | 10/1994 | Shibata | 395/472 |
| 5,394,555 | 2/1995 | Hunter et al. | 395/800 |

FOREIGN PATENT DOCUMENTS 0348628  3/1990  European Pat. Off. .

OTHER PUBLICATIONS

Gallant, Protocols keep data consistent; cache–coherency protocols, EDN, v36, n6, p. 41(6), Mar. 14, 1991.
Computer Graphics World, vol. 12, No. 8, Aug. 1989, T. McMillan pp. 39–46 "Interactive Multimedia Meets the Real World".
Communications of the Association for Computing Machinery, vol. 32, No. 7, Jul. 1989, pp. 811–822, G. David Ripley, "DVI—A Digital Multimedia Technology".

Primary Examiner—Matthew M. Kim
Attorney, Agent, or Firm—Owen Gamon; Andrew J. Dillon

[57] ABSTRACT

A multiprocessor in which processing units have local private caches and records are stored on at least a first global storage control unit. An interconnection system provides node to node data and synchronization communications between processing units and the first global storage control unit. The global storage control unit includes a coherency controller for tracking each instance of records owned by the global storage control unit currently resident on the processing units. Each processing unit executes a cache management process for freeing intervals of the local cache for the processing unit. Upon identification of an interval, the processing unit sends empty notification to the global storage control unit owning the record an instance of which was resident in the interval. Thereafter the interval is marked as invalid in a cache directory for the processing unit and indicia for the instance is deleted from a coherency directory for the global storage control unit.

16 Claims, 4 Drawing Sheets

TAG ARRAY

| TAG FIELD | VALID / INVALID | SHARE / EXCLUSIVE | DIRTY / CLEAN |
|---|---|---|---|
| 46 | 50 | 52 | 48 |
|  |  |  |  |

DATA STRUCTURE 54

| TAG FIELD | VALID / INVALID | SHARED / EXCLUSIVE | TRANSIENT FIELDS | OCCUPANCY VECTOR |
|---|---|---|---|---|
| 56 | 60 | 62 | 64 | 66 |

*Fig. 4*

SYSTEM AND METHOD FOR EMPTY NOTIFICATION FROM PEER CACHE UNITS TO GLOBAL STORAGE CONTROL UNIT IN A MULTIPROCESSOR DATA PROCESSING SYSTEM

BACKGROUND OF THE INVENTION

1. Technical Field:

This invention relates to multiprocessor data processing systems having local cache storage for a plurality of processors and a global storage control unit utilizing a global storage based directory for tracking intervals of storage drawn from a pool of storage shared by a plurality of processors.

2. Description of the Related Art:

Multiprocessors are provided by the coordinated interconnection of computers for the solution of a problem. Of particular interest are multiple-instruction stream, multiple-data stream (MIMD) architectures, which link independent processing units through exchange of data and synchronization of processing operations. The problems to which MIMD architectures are beneficially applied include those where the interaction of operations are not easily predicted a priori. In computers having an MIMD architecture each processing unit can execute its own program on its own data, as contrasted with single-instruction stream, multiple-data stream (SIMD) machines in which each processor executes the same instruction set but on a data stream particular to each processor.

In designing an MIMD architecture for a computer, a developer may draw on features of two conceptual types, including one type where all memory and input/output functions are remote to the processors and shared among the processors, and a second type where all memory and input/output functions are local and private to the processors. What is common to both types of architecture is an interconnection system over which synchronizing functions are carried out and processing units exchange data. The interconnection system may be a bus or a type of network architecture. The data traffic on some types of interconnection system, typically busses, is visible to processors, storage units and input/output units. On some network architectures, however, data traffic is not visible to all processors, storage and input/output units.

The treatment of memory in a multiprocessor is a critical design matter. The extreme design types either utilize purely shared memory or purely private memory. In a shared memory all processors have access to a global, remote memory unit. In a private memory scheme all memory is local to the processors and used directly only by a single processor. Both schemes have advantages and disadvantages, which has led to architectures which blend the schemes. One such blended architecture utilizes local, private cache for each processor or group of processors and a shared, remote memory. In these systems, the local cache and the global memory occupy different levels in a memory hierarchy for the computer. All local cache units are peers in the hierarchical scheme. The shared, remote memory is called global memory and is analogous to system memory in single processor computers.

The presence of a memory hierarchy, with cache being above global memory in the hierarchy, means that a shared datum may be represented by values resident at several locations. This occurs when a particular logical address is associated with physical locations in global memory and a plurality of cache units. The existence of both cache and system memory in itself raises issues of data coherency. Data coherency is compromised by the possibility that one variable may have location dependent values at a given instant in time. Coherency is vastly complicated by the existence of peer cache units where copies of a record may be duplicated to numerous locations over a network. Incoherence in data can result from a number of sources, e.g. process migration, input/output activity, and execution of implicit or explicit storage operations by a processor.

Assuring effective synchronization of processing units demands maintaining coherence of data among peer cache units and between cache and global memory. In other words, the values stored in the various locations associated with a logical address either agree or are somehow marked as temporarily inaccessible. The problem of coherence has been addressed by utilization of coherence protocols. A coherence protocol may provide for signalling invalidity of values for variables to the various multiprocessors, for propagating updated values for variables throughout the memory hierarchy, by defining conditions under which a local processing unit will mark blocks of data in its local cache as valid and invalid, et cetera.

A number of coherence protocols have been proposed. Some of these protocols, in an effort to minimize demand for coherency communications over the interconnection system, have required a system bus based architecture for implementation. An example of such a system is seen in U.S. Pat. No. 5,025,365 to Mathur et al. Mathur teaches a snooping coherency protocol in which processors monitor interconnection system communication for data updates and messages invalidating data. However, as the number of processors in a multiprocessor increases, access to the system bus becomes ever more difficult. Thus despite a reduced burden of communication required to maintain coherence over a bus based system where bus snooping is used, degradation in performance of the multiprocessor will still occur at some point as additional processors are added. The total number of processors which can effectively be used and be interconnected by a system bus can be held below desirable levels.

For truly large, or geographically dispersed multiprocessors, non-bus based networks are used for an interconnection system. In U.S. Pat. No. 5,151,989 to Johnson et al., a coherency protocol applicable to such interconnection systems was proposed using a directory caching technique for reducing coherency related communications. In Johnson, when a data processing system ("client") interrogates another data processing system ("server") for a unit of directory information relating to a record permanently resident on the server, the server becomes enabled to automatically send additional units of directory information back to the client upon subsequent changes in the directory structure of the server system. The server maintains coherency of its records. When the server determines that it cannot maintain coherency as to a record, it informs its clients of the fact to get the clients to purge their caches of copies the affected record. However, the client may no longer be caching the record. Such communications continue to occur because the manager of the coherency protocol has no knowledge of the status of the record on the client.

SUMMARY OF THE INVENTION

It is an object of the present invention to provide a system and method for minimizing coherency communication over the interconnection system of a multiprocessor.

It is another object of the present invention to provide a system and method for coherency in a multiprocessor where processing units have point to point communication with global storage control units.

Other objects, features and advantages will be apparent in the written description of the invention that follows. A multiprocessor includes a plurality of processing units with local private caches and at least a first global storage control unit. An interconnection system carries data and synchronization communications between processing units and the first global storage control unit. The global storage control unit includes a coherency controller for tracking each instance currently copied to the processing units of records owned by the global storage control unit. Each processing unit executes a cache management process for freeing intervals of the local cache for the processing unit. Upon identification by a processing unit of an instance to be purged, even if the data representation held by the local cache need not be provided the global storage control unit, the processing unit sends notification to the global storage control unit owning the record corresponding to instance. An empty notification identifies the real interval of the record, but includes no data representation. The interval is marked as invalid in a cache directory for the processing unit and the entry for the instance is directory for the global storage control unit.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a block diagram of a data structure for a cache directory for use within a processor unit;

FIG. 4 is a block diagram of a data structure for a directory for use by a global storage control unit.

These drawings are not intended as a definition of the invention but are provided solely for the purpose of illustrating one of the preferred embodiments of the invention described below.

DETAILED DESCRIPTION OF THE INVENTION

Figure 1:
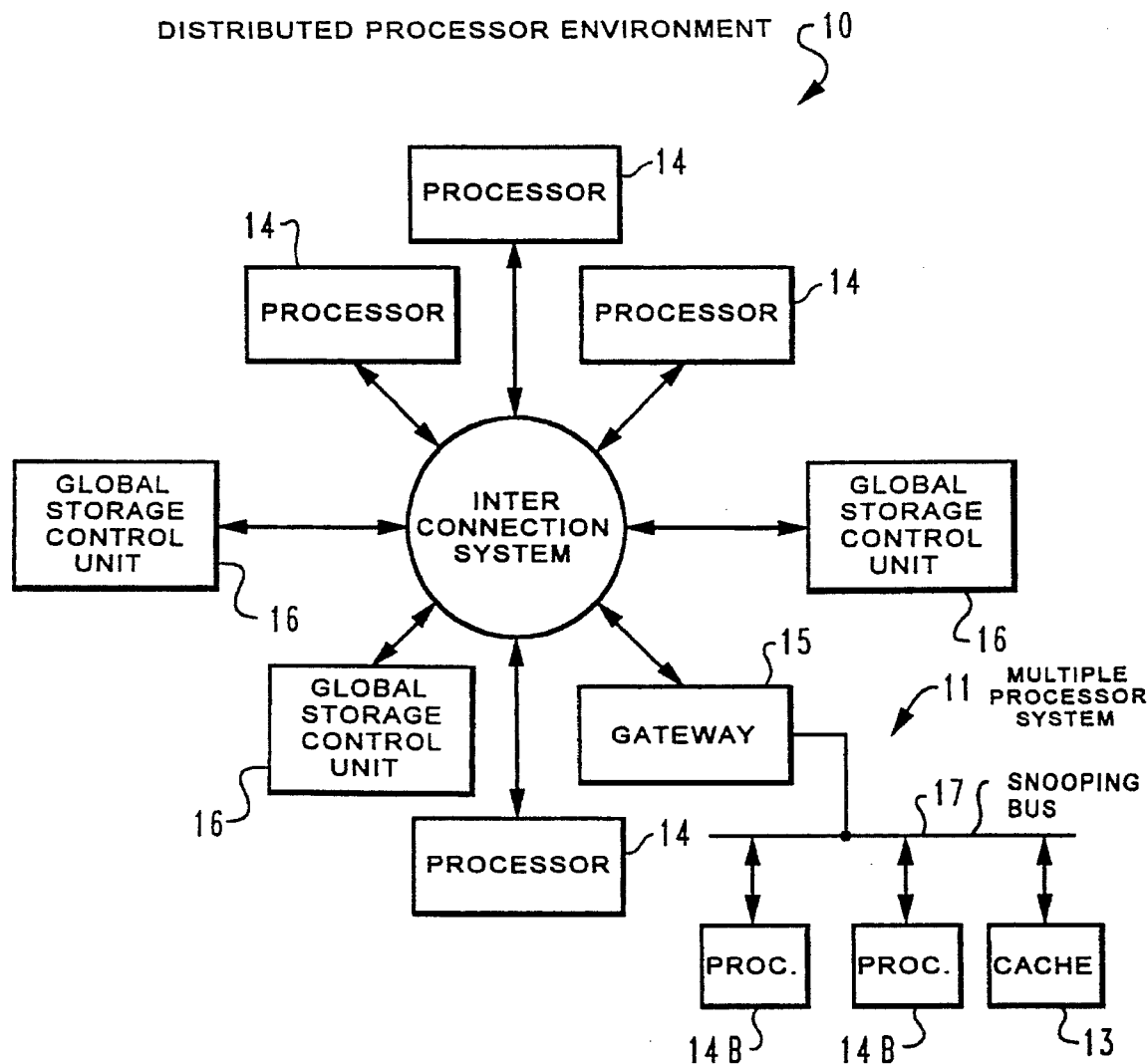
FIG. 1 is a block diagram schematic of a multiprocessor.

As shown in FIG. 1, a distributed processor environment 10 may consist of a plurality of nodes which communicate through an intercommunication system 12. Two types of nodes illustrated include processor nodes 14 and global storage control unit nodes 16. Intercommunication system 12 can be a high speed communication pathway used in a single computer, local area network or a wide area network, the latter comprising a switched teleprocessing connection to either nodes or to a network of systems or a blend of systems. Examples of high speed communications pathways include the Scalable Coherence Interface (Institute of Electrical and Electronics Engineers Standard 1596) and message based components of the Multibus II interconnect. While processor nodes 14 and global storage control units 16 are separately identified, a given node may assume one or both of the functions implied by the labels. In general however, a global storage control unit 16 owns a record accessible through a shared memory maintained on the storage unit by anyone of processors 14. Interconnection system 12 is typically of an architecture which does not permit processor snooping on communication sessions between a processor 14 and a global storage control unit 16. Global storage control unit 16 has general responsibility for maintaining data coherence of records permanently resident in the memory associated with the global storage control unit.

A gateway 15 connects interconnection system 12 to a multiple processor system 11 based on a snooping bus 17 and having a plurality of processors 14B. Cache 13 is shared among processors 14B but is inaccessible to processors 14 connected directly to interconnection system 12. Multiple processor system 11 appears to interconnection system 12 as another processor node.

Figure 2:
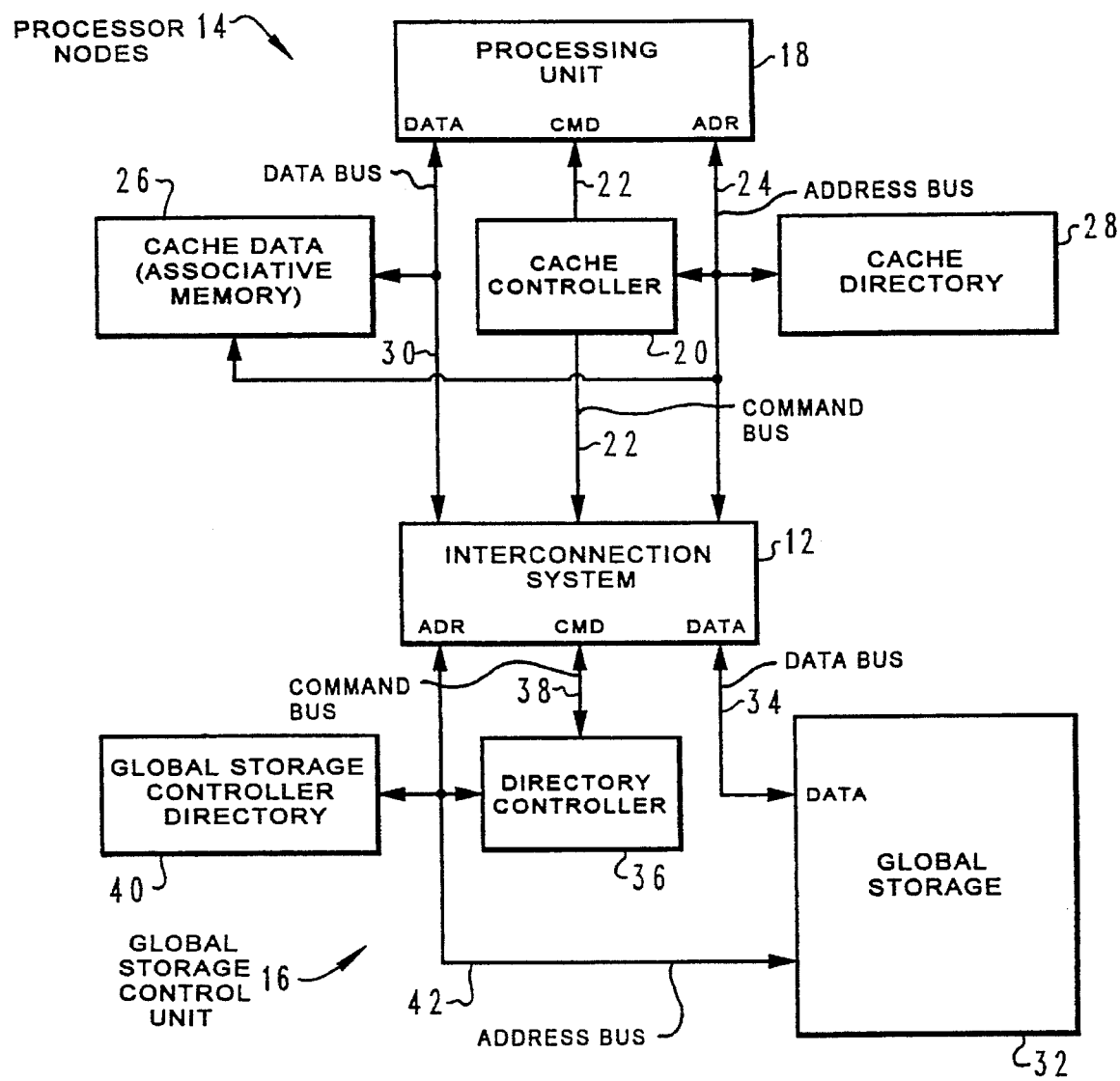
FIG. 2 is a block diagram of a processor unit and a global storage control unit (GSCU) for use in the multiprocessor of FIG. 1.

FIG. 2 illustrates in block diagram form the functional components of a processor 14 and a global storage control unit 16.

Processor 14, which is typical of the processors 14 of FIG. 1, is essentially an independent computer. Only the features pertinent to the present invention are described here. Processor 14 includes a processing unit 18. The processing unit 18 contains the sequencing and processing facilities for instruction execution, interruption action, timing functions, initial program loading and other machine related functions. Other functions subsumed by processing unit 18 may include local memory and input/output devices for use by a user.

A cache controller 20 is connected to processing unit 18 by a command bus 22 and an address bus 24. Cache controller 20 is part of a cache data array unit which includes an associative memory 26 and a cache directory 28. Processing unit 18 is connected to associative memory 26 by a data bus 30 and address bus 24. Processing unit 18 is connected to cache directory 28 by address bus 24. Address bus 24, command bus 22 and data bus 30 all also connect to interconnection system 12.

Data bus 30 is used for transfer of data from associative memory 26 to processing unit 18 and from interconnection system 12 into associative memory 26.

Cache controller 20 interprets commands over command bus 22 from processing unit 18. These commands are typically reads or writes. Cache controller 20 will interrogate a tag array maintained in cache directory 28 to determine if data required by processing unit 18 is resident in associative memory 26, and whether that data is valid or invalid, and shared or exclusive. Data is kept in the associative memory 26 in accordance with a cache management protocol periodically executed by processing unit 18. Such protocols are conventional and generally are based upon keeping more recently used data in cache and providing space within cache for newly required data by displacing data which is least recently used. The mechanics of selection of such intervals is not important here. Rather, the fact that intervals within associative memory 26 are periodically identified for purging is important. Each processor 14 has a unique identifier which is provided to it at the point in time of its connection into multiprocessor 10 or upon initial program load of multiprocessor 10. It is anticipated, although not required, that a virtual memory management system is provided.

A global storage control unit 16 comprises a global storage or shared memory unit 32 which is connected to interconnection system 12 by a data bus 34. A directory controller 36 is connected to interconnection system 12 by a command bus 38. A global storage controller directory 40 is connected to interconnection system 12, directory controller 36 and global storage 32 by an address bus 42. Directory controller 36 and global storage controller directory 40 are provided for the management of records with respect to which recorded instances have been distributed among one or more remote processors 12. Data structures used by directory controller 36 and cache controller 20 have similarities for purposes of the coherence protocol.

FIG. 3 illustrates a tag array 44 maintained in cache directory 28. Tag directory 44 includes space for a plurality of entries, with each entry being associated with an interval or block within global storage 32. In systems where virtual memory is provided more than one entry may be associated with a particular real interval. Each entry includes a tag field 46, an invalid field 50, and a shared/exclusive field 52. A dirty/clean field 48 is used to indicate if has a record been modified by the local processor but not yet stored back to shared global memory. If the copy is clean, the cache instance of the record and the record in shared global memory are the same. Field 48 is meaningful only when the record is exclusive to the local processor. Empty notifications are sent on purges of records from local caches which are exclusive and clean, or shared. Additional fields may exist, for example, were a virtual storage system in use, a virtual address hash field might be provided for a record.

A copied instance of a record may exist in cache for a valid marked entry in tag array 44. When an empty notification is in transit from cache to a global storage control unit the cache controller may choose to delete the entry for the record from the cache directory. An interval is valid if its coherency is being maintained by the global storage control unit. Otherwise the interval is invalid. If an entry is marked shared, the local processor does not have write authority to the record through the instance. If an entry is marked exclusive and valid, the processor is the only processor which has a copy of the record and the local processor is allowed to change values within the instance and the record. In addition a directory may include a conversion table between real and virtual addresses.

FIG. 4 illustrates data structure for global storage control directory 40. Data structure 54 includes a tag field 56, a virtual address field 58, a valid/invalid field 60, a shared/exclusive field 62, a plurality of transient fields 64 and an occupancy vector 66. An entry in data structure 54 corresponds to an instance resident on one or more private local caches. Accordingly, tag field 56 and virtual address field will, for a valid entry, be identical to the contents of corresponding entry in tag array 44. Valid/invalid field 60 is interpreted somewhat differently than the entry in valid/invalid field 50 of tag array 44. If the field is valid, some cache somewhere in the multiprocessor has a copied instance of the record. If this field is invalid no cache holds an instance of the record. Shared/exclusive field 62 indicates if more than one cache has an instance. Exclusive indicates that exactly one instance has been copied to a local cache. Shared status means more than one instance has been copied out. Field 62 has meaning only if field 60 is valid. Transient fields 64 are used to indicate outstanding messages awaiting a response. While this field is essential for appropriate sequencing of operations such as requests for exclusive rights to a record, its contents are of no particular importance in understanding the present invention.

Occupancy vector field 66 consists of a series of bits each of which represents a cache or a set of caches. A bit set to one will identify the particular cache with which the entry is associated. Alternatively, the unique identifier of one or more processor/cache units may be recorded in a sequence of occupancy entries. Since there are typically fewer entries that local cache units, such a design may initiate a purge from the global directory if all entry locations are occupied and a request to share the entry is received. In the case where an occupancy bit represents a set of caches on a snooping bus, the transmission by one cache of an empty notification occurs initially on the bus. The other caches on the snooping bus indicate if they have a copy. Only if they do not is the empty notification forwarded to the global storage control unit.

Figure 5:
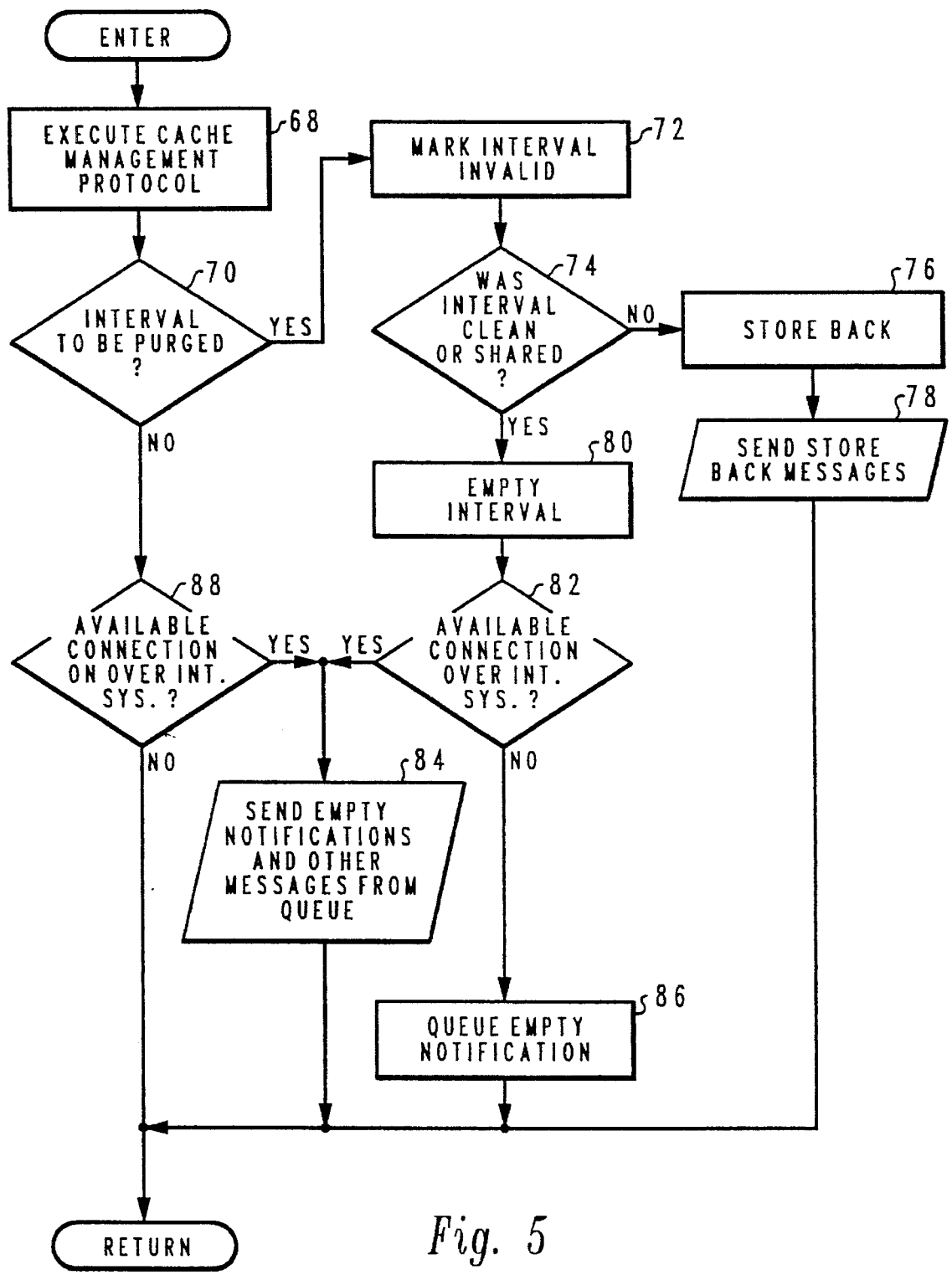
FIG. 5 is a logical flow chart of a process for implementing the present invention on a processor forming part of a multiprocessor processing unit.

FIG. 5 is a flowchart illustrating a process for determining times for a processor 14 to issue an empty notification to a global storage control unit 16. An empty notification identifies a record instance released by the processor. The process is entered at step 68 indicating execution of a cache management protocol. At step 70 it is determined if an interval has been identified for purging from the cache 26. If YES, step 72 is executed to mark the instance of the record stored in associative memory as invalid and for construction of a message for transmission to the global storage control unit identifying the real interval. The message may have the following format:

Global storage control unit ID, Processor identification, Tag.

Though the specific format is not important, the semantic content is. For some systems additional fields may be used.

Next, step 74 is executed to determine if the interval/record is clean or shared. If the record is neither clean or shared it means that it is exclusive and has been altered. The NO branch is followed to step 76 to prepare a storing message to the global shared memory. Step 78 indicates transmission of the backing store message. Where the record was either clean or shared, step 80 is executed along the YES branch, indicating release of the interval in local caches. Next, step 82 is executed to determine if a connection is available to the appropriate global storage control unit. If YES, step 84 is executed to send an empty notification message to the coherency controller or global storage control unit where the record, associated with the invalidated instance, is permanently stored. Any prior empty notification messages which were buffered for lack of a connection are also transmitted. If at step 82 it is determined that no connection over interconnection system 12 is available, step 86 is executed to buffer the empty notification message in a queue for later transmission.

Returning to step 70, and the processing following an indication that no interval has been identified for purging, step 88 is executed to determine if a connection is available over the interconnection system to a global storage control unit. If YES, step 84 follows to transmit one or all empty notification messages targeted for the global storage control unit from the queue. Following steps 88, 84, 86 and 78 the process is exited.

The present invention initiates a message from cache to memory base directory whenever the cache elects to invalidate a cache entry and, there is no need to also send the updated content of the cache buffer to global memory once a connection is available to carry the message it is sent. This allows maintenance of a much less conservative image of cache status in the global storage control unit. As a result, the global storage directory is less likely to defer an access request for exclusive usage of a record. As a result, system performance improves. Furthermore, the cache, the interconnection system or the global storage control unit, may buffer empty messages to be sent to the memory based directory until reaching a point in time where there is no other need for interconnected bandwidth. Thus the empty notification sent to the memory based directory does not divert usable interconnected bandwidth from other utilization having further beneficial effects on performance of a multiprocessor.

While the invention has been particularly shown and described with reference to a preferred embodiment, it will be understood by those skilled in the art that various changes in form and detail may be made therein without departing from the spirit and scope of the invention.

What is claimed is:

1. A multiprocessor, comprising:

a plurality of processing units;

a local private cache within each processing unit;

at least a first global storage control unit providing a shared memory space for storing a plurality of records for access by the plurality of processing units where each of the plurality of records may be modified by one of the plurality of processing units;

an interconnection system between the plurality of processing units and the first global storage control unit for providing data and synchronization communications between the plurality of processing units and the first global storage control unit;

a coherency controller in the global storage control unit for tracking each instance of records owned by the global storage control unit which are currently resident in the local private cache for a particular processing unit; and means for transmitting an empty notification from said particular processing unit to the global storage control unit identifying instances purged from the local private cache for said particular processing unit whether or not said instances have been modified by said particular processing unit wherein a subsequent request for exclusive access to said instances need not await confirmation of purging of said instances from said local private cache for said particular processing unit.

2. The multiprocessor as set forth in claim 1, wherein:

the means for transmitting is responsive to identification of an interval for an instance to be purged for including the interval in the empty notification.

3. The multiprocessor as set forth in claim 2, wherein the empty notification includes an identification of the processing unit which includes the means for transmitting.

4. The multiprocessor as set forth in claim 3, and further comprising:

means for marking an entry representative of an interval as invalid in a local private cache directory for the processing unit upon identification of an instance being purged from a local cache private; and means for deleting indicia for the instance from a coherency directory for the global storage control unit.

5. The multiprocessor as set forth in claim 4, wherein the means for deleting invalidates the entry for a record in the coherency directory if no indicia of instances remain.

6. The multiprocessor as set forth in claim 1, and further comprising:

means for buffering an empty notification when the means for transmitting is unavailable.

7. The multiprocessor as set forth in claim 1, wherein instances purged from the local private cache are clean or shared.

8. The multiprocessor as set forth in claim 6, wherein the means for buffering is within the interconnection system.

9. The multiprocessor as set forth in claim 6, wherein the means for buffering is within the global storage control unit.

10. A method for maintaining data coherency on a multiprocessor including a plurality of private caches and at least a first shared memory, the method comprising the steps of:

storing instances in the private caches of records resident in the first shared memory;

generating a cache directory for each private cache, the cache directory including a tag array having an entry for each instance stored in the private cache, each entry indicating validity or invalidity for each instance, and marking whether an instance is clean;

executing a cache management process for each private cache to purge instances in the private cache;

generating a coherency directory having indicia for each instance of a record resident in a private cache;

upon selection of a valid interval for invalidation, remarking the interval as invalid in the cache directory and transmitting an empty notification of the interval from the private cache to the first shared memory whether or not the instance has been modified; and then deleting the indicia of the instance from the coherency directory.

11. A method for maintaining data coherency, the method comprising the steps of:

copying instances of records from a shared memory to one or more private caches;

for each instance of a record copied to a private cache, making an entry in a coherency directory for the shared memory indicating the private cache where the instance is resident and identifying by a tag for a real address where the record is located in shared memory;

for each instance of a record copied to a private cache, making an entry in a cache directory identifying the instance by a tag for a real address for the record and indicating validity or invalidity of the instance;

upon locally generated invalidation of a clean or shared instance in a private cache, transmitting a message over an interconnection system identifying the tag without a data, representation of the instance.

12. The method for maintaining data coherency as set forth in claim 11, and further comprising the steps of:

with each entry in the cache directory and the coherency directory, indicating whether a processor associated with the private cache that an instance is resident within has write authority through the instance to the record.

13. The method for maintaining data coherency as set forth in claim 11, and further comprising buffering each message until a connection slot over an interconnection system becomes available.

14. A multiprocessor system, comprising:

a shared memory;

a plurality of private caches;

means for copying instances of records stored on the shared memory to each of the plurality of private caches;

means associated with each private cache and responsive to each instance of a record copied to a private cache, for making an entry in a coherency directory for the shared memory indicating the private cache where the instance is resident and identifying by a tag where the record is located in shared memory;

means responsive to each instance of a record copied to a private cache for making an entry in a cache directory identifying the instance by a tag for the record and indicating validity or invalidity of the instance; and means responsive to invalidation of an instance in a private cache for identifying the tag but including no data from the instance in a message to the shared memory; and means responsive to identification of a tag without any data for the instance associated with the tag for deleting indicia of the instance from the coherency directory.

15. The multiprocessor system as set forth in claim 14, and further comprising:

with each entry in the cache directory and the coherency directory indicating whether a processor associated with the private cache that an instance is resident within has write authority through the instance to the record.

16. A multiprocessor system comprising:

a plurality of processors;

a pool of storage shared by the plurality of processors which includes a plurality of intervals of data;

private storage accessible by at least a first processor but less than all of the plurality of processors;

means for generating a data representation in the private storage over an interval of data drawn from the pool of storage;

a private directory for providing status indicia of the data representation in the private storage including indicia of coherence or possible lack of coherence for each data representation;

a global directory for providing status indicia of each data representation over an interval drawn from the pool of storage;

means utilizing the status indicia in the global directory for maintaining the coherence of the data representations;

means for purging data representations from the private storage; and means responsive to purging of a data representation for determining coherence of the data representation and, if coherent, for providing an empty notification of purging to the global directory.

\* \* \* \* \*